US012687759B2

(12) United States Patent
Kunai et al.

(10) Patent No.: US 12,687,759 B2
(45) Date of Patent: Jul. 21, 2026

(54) OPTICAL SWITCH AND SWITCHING METHOD

(71) Applicant: Fujikura Ltd., Tokyo (JP)

(72) Inventors: Yuichiro Kunai, Tokyo (JP); Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 214 days.

(21) Appl. No.: 18/730,456

(22) PCT Filed: Dec. 19, 2022

(86) PCT No.: PCT/JP2022/046583
§ 371 (c)(1),
(2) Date: Jul. 19, 2024

(87) PCT Pub. No.: WO2023/145298
PCT Pub. Date: Aug. 3, 2023

(65) Prior Publication Data
US 2025/0147380 A1 May 8, 2025

(30) Foreign Application Priority Data
Jan. 31, 2022 (JP) ................................. 2022-013191

(51) Int. Cl.
*G02F 1/31* (2006.01)
(52) U.S. Cl.
CPC ...................................... *G02F 1/31* (2013.01)
(58) Field of Classification Search
CPC ........................................................ G02F 1/31

USPC ........................................................... 359/320
See application file for complete search history.

(56) References Cited

U.S. PATENT DOCUMENTS

| | | | |
|---|---|---|---|
| 6,603,904 B1 | 8/2003 | Shahar | |
| 2019/0113775 A1 | 4/2019 | Jang et al. | |

FOREIGN PATENT DOCUMENTS

| | | | | |
|---|---|---|---|---|
| JP | 2004-177899 A | 6/2004 | | |
| JP | 2007-225826 A | 9/2007 | | |
| JP | 2009-92968 A | 4/2009 | | |
| JP | 2015-94779 A | 5/2015 | | |
| JP | 2016122152 A | * | 7/2016 | |

OTHER PUBLICATIONS

Written Opinion issued in corresponding International Application No. PCT/JP2022/046583, mailed Feb. 28, 2023, with translation (7 pages).
International Search Report issued in corresponding International Application No. PCT/JP2022/046583, mailed Feb. 28, 2023 (2 pages).

* cited by examiner

*Primary Examiner* — William Choi
(74) *Attorney, Agent, or Firm* — Osha Bergman Watanabe & Burton LLP

(57) ABSTRACT

An optical switch that switches an optical path of signal light obtained by modulating carrier light by a control signal and a data signal, includes an optical modulation element that reflects or refracts the signal light and includes cells each having an independently set phase modulation amount with which the signal light is emitted in a direction corresponding to a ratio of a period of the control signal to a period of the carrier light.

7 Claims, 7 Drawing Sheets

OPTICAL SWITCH AND SWITCHING METHOD

BACKGROUND

Technical Field

The present invention relates to an optical switch and a switching method each of which switches an optical path of signal light from one to another.

Discussion of the Background

With increasing data traffic, the demand for increased capacity in optical trunk line networks is increasing. In order to respond to this demand, the form of the optical trunk line network is developed from the point-to-point type to the ring type, and then to the mesh type. For efficient use of the mesh-type optical trunk line network, it is necessary to quickly switch the path of the signal light from one to another. Known optical switches capable of quickly switching the path of the signal light from one to another include an optical switch using a digital mirror device (DMD) and an optical switch using a liquid crystal on silicon (LCOS). For example, Patent Literature 1 discloses an optical switch using LCOS.

PATENT LITERATURE

Patent Literature 1: JP Patent Publication No. 2015-94779

In an optical network, it is sometimes necessary to switch a path of signal light from one to another according to a control signal (e.g., a control signal that designates a destination of the signal light) superimposed on the signal light. However, the optical switch using DMD or LCOS itself does not have such a function. Thus, in order to realize the function, it is necessary to decode a control signal from signal light and to control the optical switch according to the control signal. This may cause complexity in the device and may make it difficult to increase the switching speed, disadvantageously.

SUMMARY

One or more embodiments provide an optical switch having a function to switch an optical path of signal light from one to another according to a control signal.

An optical switch in accordance with one or more embodiments is an optical switch that switches an optical path of signal light from one to another, the signal light being obtained by modulating carrier light by a control signal and a data signal, the optical switch including: an optical modulation element configured to reflect or refract the signal light, the optical modulation element including a plurality of cells having phase modulation amounts settable independently of each other, the phase modulation amounts of the plurality of cells included in the optical modulation element being set so that the signal light is emitted in a direction corresponding to a ratio of a period of the control signal with respect to a period of the carrier light.

A switching method in accordance with one or more embodiments is a switching method that switches an optical path of signal light from one to another, the signal light being obtained by modulating carrier light by a control signal and a data signal, the switching method including the step of: reflecting or refracting the signal light with use of an optical modulation element including a plurality of cells having phase modulation amounts settable independently of each other, the phase modulation amounts of the plurality of cells included in the optical modulation element being set so that the signal light is emitted in a direction corresponding to a ratio of a period of the control signal with respect to a period of the carrier light.

In accordance with one or more embodiments, it is possible to switch an optical path of signal light from one to another according to a period of a control signal.

DESCRIPTION OF THE EMBODIMENTS (Configuration of Optical Switch)

Figure 1:
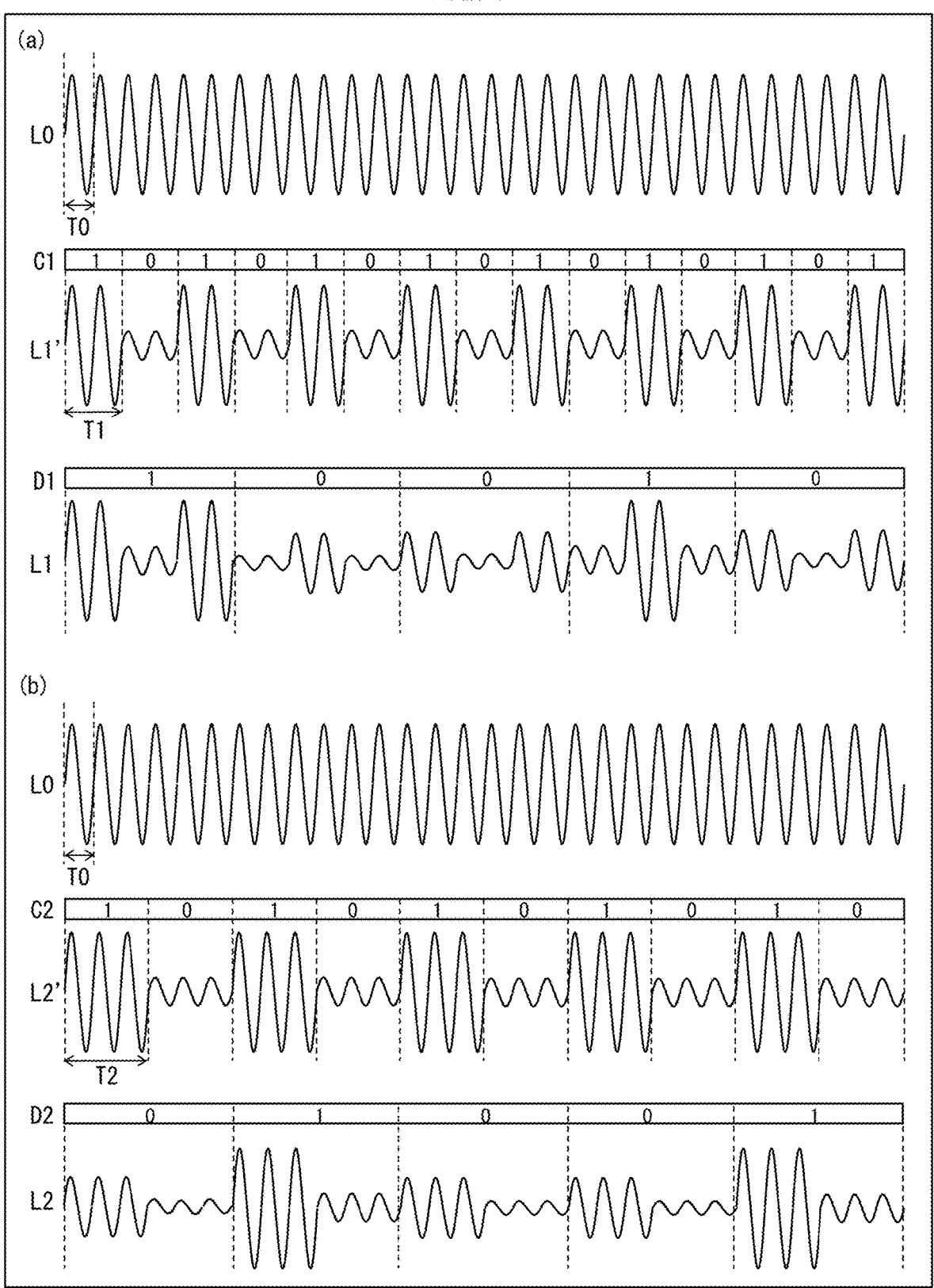
FIG. 1 shows waveform charts illustrating, as an example, waveforms of signal light to be input into an optical switch shown in FIG. 2.
Figure 2:
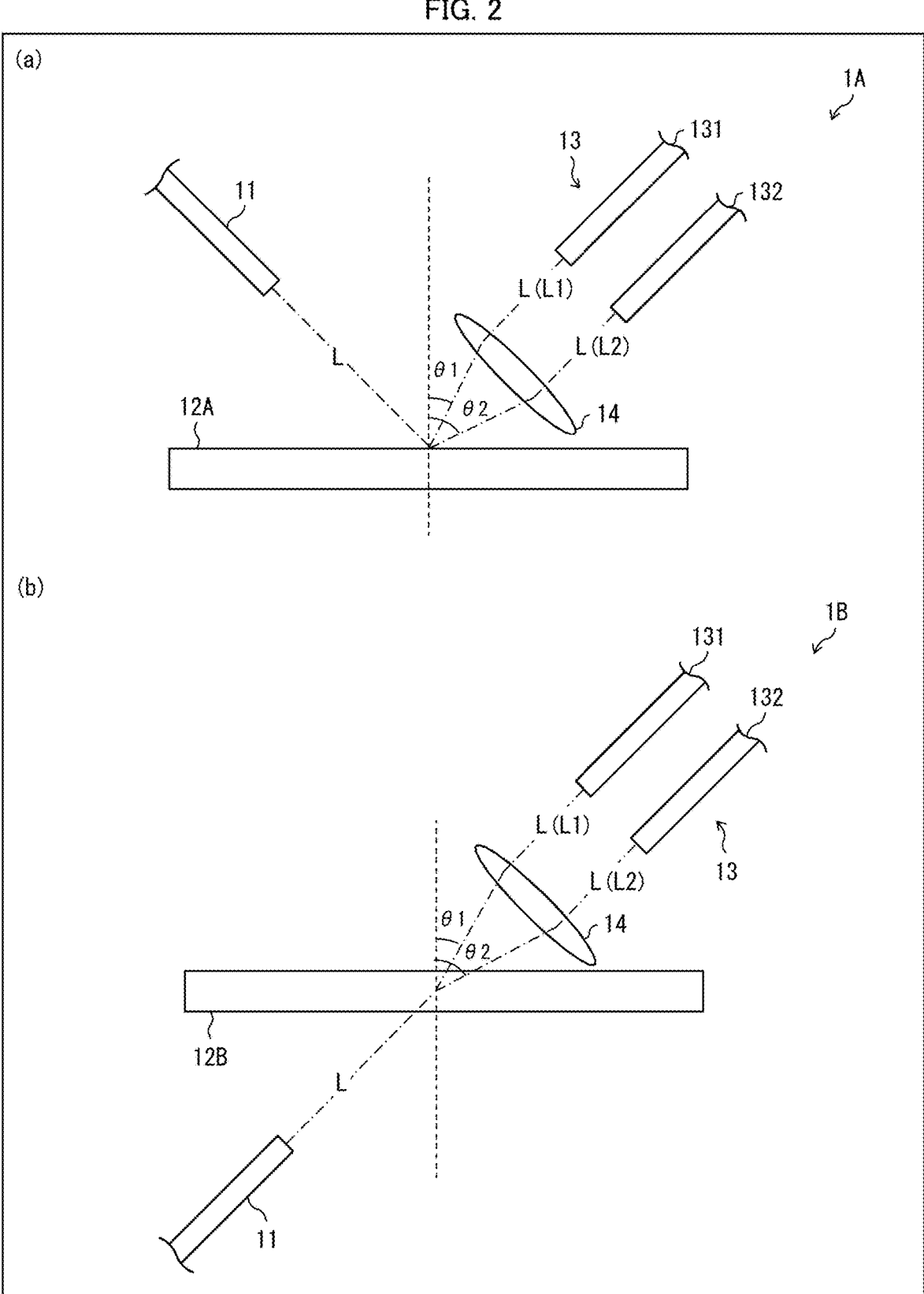
FIG. 2 shows a side view illustrating a configuration of an optical switch in accordance with one or more embodiments, more specifically, a configuration of an optical switch including a reflective optical modulation element and a configuration of an optical switch including a transmissive optical modulation element.

The following description will discuss, with reference to FIGS. 1 and 2, a configuration of an optical switch 1 in accordance with one or more embodiments.

The optical switch 1 is a device that switches an optical path of signal light L from one to another, the signal light L being obtained by modulating carrier light L0 by a control signal C and a data signal D. Here, the control signal C is a periodic signal of a period T. In one or more embodiments, assumed as the signal light L which is to be input into the optical switch 1 is two kinds of signal light, that is, signal light L1 and signal light L2. The signal light L1 is obtained by modulating the carrier light L0 by a control signal C1 and a data signal D1. The signal light L2 is obtained by modulating the carrier light L0 by a control signal C2 and a data signal D2.

FIG. 1 shows waveform charts illustrating, as an example, waveforms of the signal light L1 and the signal light L2.

(a) of FIG. 1 illustrates, as an example, a waveform of the carrier light L0, a waveform of signal light L1' obtained by modulating the carrier light L0 by the control signal C1, and a waveform of the signal light L1 obtained by modulating the signal light L1' by the data signal D1. In the example shown in (a) of FIG. 1, a period T1 of the control signal C1 is twice longer than a period T0 of the carrier light L0.

However, the order of the processes for modulation is not limited to this. Specifically, instead of the configuration in which the carrier light L0 is modulated by the control signal C1 and then by the data signal D1, a configuration in which the carrier light L0 is modulated by the data signal D1 and then by the control signal C1 may be employed.

(b) of FIG. 1 illustrates, as an example, a waveform of the carrier light L0, a waveform of signal light L2' obtained by modulating the carrier light L0 by the control signal C2, and a waveform of the signal light L2 obtained by modulating the signal light L2' by the data signal D2. In the example shown in (b) of FIG. 1, a period T2 of the control signal C2 is three times longer than the period T0 of the carrier light L0.

However, the order of the processes for modulation is not limited to this. Specifically, instead of the configuration in which the carrier light L0 is modulated by the control signal C2 and then by the data signal D2, a configuration in which the carrier light L0 is modulated by the data signal D2 and then by the control signal C2 may be employed.

(a) of FIG. 2 shows a side view illustrating a first configuration of the optical switch 1. Hereinafter, the optical switch 1 having the first configuration may also be referred to as an optical switch 1A.

As shown in (a) of FIG. 2, the optical switch 1A includes an input port 11, an optical modulation element 12A, an output port group 13, and a lens 14.

The input port 11 is a means that guides the signal light L having not been reflected by the optical modulation element 12A yet. One or more embodiments employ an optical fiber as the input port 11. The signal light L emitted from the input port 11 enters the optical modulation element 12A.

The optical modulation element 12A is a means that modulates and reflects the signal light L, and is constituted by a plurality of cells having phase modulation amounts set independently of each other or a plurality of cells having phase modulation amounts settable independently of each other. The optical modulation element 12A may sometimes be called a "spatial light modulator". A configuration example of the optical modulation element 12A will be described later with reference to a different drawing. The phase modulation amounts of the cells constituting the optical modulation element 12A are set so that the signal light L is emitted in a direction corresponding to a ratio T/T0, which is a ratio of the period T of the control signal C with respect to the period T0 of the carrier light L0. In the illustrated example, the following setting is made.

In a case where the signal light L is the above-described signal light L1, that is, in a case where the ratio T/T0 is R1 (2 in the example shown in FIG. 1), the optical modulation element 12A reflects the signal light L so that an emission angle thereof is θ1. Meanwhile, in a case where the signal light L is the above-described signal light L2, that is, in a case where the ratio T/T0 is R2 (3 in the example shown in FIG. 1), the optical modulation element 12A reflects the signal light L so that an emission angle thereof is θ2.

The output port group 13 is constituted by a plurality of output ports 131 and 132. Each of the output ports 131 and 132 is a means that guides the signal light L having been reflected by the optical modulation element 12A. One or more embodiments employ an optical fiber as each of the output ports 131 and 132.

The output port 131 is disposed on an optical path of the signal light L having been reflected by the optical modulation element 12A with the ratio T/T0 at R1. Thus, in a case where the ratio T/T0 is R1, the signal light L having been reflected by the optical modulation element 12A enters the output port 131 and then is guided through the output port 131. Meanwhile, the output port 132 is disposed on an optical path of the signal light L having been reflected by the optical modulation element 12A with the ratio T/T0 at R2. Thus, in a case where the ratio T/T0 is R2, the signal light L having been reflected by the optical modulation element 12A enters the output port 132 and then is guided through the output port 132.

The lens 14 is a means that collects the signal light L having been reflected by the optical modulation element 12A. The lens 14 collects, into an entrance end surface of the output port 131, the signal light L having been reflected by the optical modulation element 12A with the ratio T/T0 at R1. Further, the lens 14 collects, into an entrance end surface of the output port 132, the signal light L having been reflected by the optical modulation element 12A with the ratio T/T0 at R2. Providing the lens 14 makes it possible to cause the signal light L having been reflected by the optical modulation element 12A to efficiently enter the output ports 131 and 132.

Note that the optical switch 1A may include a plurality of sets of the input port 11 and the output port group 13. With this, it is possible to realize a multichannel optical switch by using a single optical modulation element 12A.

(b) of FIG. 2 shows a side view illustrating a second configuration of the optical switch 1. Hereinafter, the optical switch 1 having the second configuration may also be referred to as an optical switch 1B.

As shown in (b) of FIG. 2, the optical switch 1B includes an input port 11, an optical modulation element 12B, an output port group 13, and a lens 14.

The input port 11 is a means that guides the signal light L having not passed through the optical modulation element 12B yet. One or more embodiments employ an optical fiber as the input port 11. The signal light L emitted from the input port 11 enters the optical modulation element 12B.

The optical modulation element 12B is a means that modulates and refracts the signal light L, and is constituted by a plurality of cells having phase modulation amounts set independently of each other or a plurality of cells having phase modulation amounts settable independently of each other. The optical modulation element 12B may sometimes be called a "spatial light modulator". A configuration example of the optical modulation element 12B will be described later with reference to a different drawing. The phase modulation amounts of the cells constituting the optical modulation element 12B are set so that the signal light L is emitted in a direction corresponding to a ratio T/T0, which is a ratio of the period T of the control signal C with respect to the period T0 of the carrier light L0. In the illustrated example, the following setting is made.

In a case where the signal light L is the above-described signal light L1, that is, in a case where the ratio T/T0 is R1 (2 in the example shown in FIG. 1), the optical modulation element 12B refracts the signal light L so that an emission angle thereof is θ1. Meanwhile, in a case where the signal light L is the above-described signal light L2, that is, in a case where the ratio T/T0 is R2 (3 in the example shown in FIG. 1), the optical modulation element 12B refracts the signal light L so that an emission angle thereof is θ2.

The output port group 13 is constituted by a plurality of output ports 131 and 132. Each of the output ports 131 and 132 is a means that guides the signal light L having passed through the optical modulation element 12B. One or more embodiments employ an optical fiber as each of the output ports 131 and 132.

The output port 131 is disposed on an optical path of the signal light L having been refracted by the optical modulation element 12B with the ratio T/T0 at R1. Thus, in a case where the ratio T/T0 is R1, the signal light L having been refracted by the optical modulation element 12B enters the output port 131 and then is guided through the output port 131. Meanwhile, the output port 132 is disposed on an optical path of the signal light L having been refracted by the optical modulation element 12B with the ratio T/T0 at R2. Thus, in a case where the ratio T/T0 is R2, the signal light L having been refracted by the optical modulation element 12B enters the output port 132 and then is guided through the output port 132.

The lens 14 is a means that collects the signal light L having been refracted by the optical modulation element 12B. The lens 14 collects, into the entrance end surface of the output port 131, the signal light L having been refracted by the optical modulation element 12B with the ratio T/T0 at R1. Further, the lens 14 collects, into the entrance end surface of the output port 132, the signal light L having been refracted by the optical modulation element 12B with the ratio T/T0 at R2. Providing the lens 14 makes it possible to cause the signal light L having been refracted by the optical modulation element 12B to efficiently enter the output ports 131 and 132.

Note that the optical switch 1B may include a plurality of sets of the input port 11 and the output port group 13. With this, it is possible to realize a multichannel optical switch by using a single optical modulation element 12B.

(Configuration Example of Reflective Optical Modulation Element)

Figure 3:
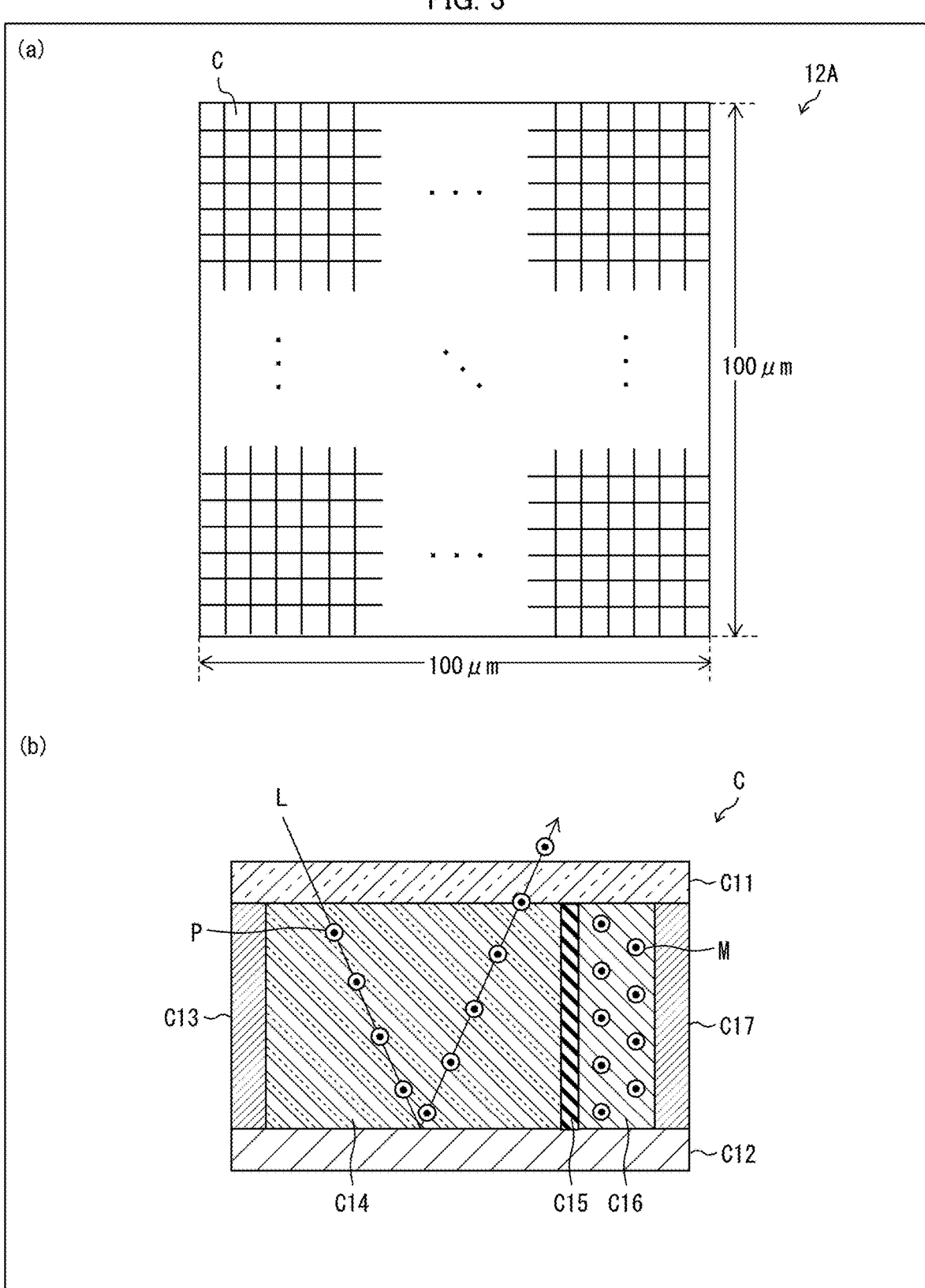
FIG. 3 shows a plan view of the optical modulation element included in the optical switch shown in (a) of FIG. 2 and a cross-sectional view of a cell included in the optical modulation element.

The following description will discuss, with reference to FIG. 3, a configuration example of a reflective optical modulation element 12A included in the optical switch 1A. (a) of FIG. 3 is a plan view of the optical modulation element 12A in accordance with the present specific example. (b) of FIG. 3 is a cross-sectional view of a microcell C included in the optical modulation element 12A in accordance with the present specific example.

As shown in (a) of FIG. 3, the optical modulation element 12A is constituted by a plurality of microcells C having phase modulation amounts settable independently of each other. When signal light L enters the optical modulation element 12A, the resulting beams of the signal light L being reflected by the microcells C while being subjected to phase modulation interfere with each other, whereby signal light L to be emitted in a direction corresponding to the ratio T/T0 is formed. The phase modulation amount of each microcell C may be variable or fixed. In the present configuration example, the phase modulation amount of each microcell C is variable.

Note that, in the present specification, the "microcell" refers to a cell having a cell size of less than 10 μm, for example. The "cell size" refers to a square root of an area of the cell. For example, in a case where the microcell C has a square shape in a plan view, the cell size of the microcell C refers to a length of one side of the microcell C. A lower limit of the cell size of the microcell C is, for example, 1 nm.

The optical modulation element 12A illustrated as an example in (a) of FIG. 3 is constituted by 200×200 microcells C arranged in a matrix. Each of the microcells C has a square shape having a size of 500 nm×500 nm in a plan view. The optical modulation element 12A has a square shape having a size of 100 μm×100 μm in a plan view.

Each of the microcells C constituting the optical modulation element 12A may include, for example, a polarizing plate C11, a reflecting plate C12, a first electrode C13, a magnetization free layer C14, an insulating layer C15, a magnetization fixed layer C16, and a second electrode C17, as shown in (b) of FIG. 3.

The polarizing plate C11 and the reflecting plate C12 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the reflecting plate C12. Here, a direction in which the first electrode C13, the magnetization free layer C14, the insulating layer C15, the magnetization fixed layer C16, and the second electrode C17 are stacked is orthogonal to a direction in which the polarizing plate C11 and the reflecting plate C12 are stacked. Thus, a first side surface of the magnetization free layer C14 is in surface contact with one main surface of the polarizing plate C11, and a second side surface of the magnetization free layer C14 which second side surface is opposite to the first side surface is in surface contact with one main surface of the reflecting plate C12. Signal light L (1) enters an inside of the magnetization free layer C14 through the polarizing plate C11, (2) is reflected by the reflecting plate C12, and (3) is emitted through the polarizing plate C11 to an outside of the magnetization free layer C14.

The magnetization free layer C14 is made of, for example, a soft magnetic material having electric conductivity and light transmissivity (for example, CoFeB). The magnetization fixed layer C16 is made of, for example, a hard magnetic material having electric conductivity (for example, permalloy). Selected as the polarizing plate C11 is a polarizing plate that selectively transmits a polarized light component having a polarization direction P parallel to a magnetization direction M of the magnetization fixed layer C16. (b) of FIG. 3 illustrates, as an example, a case where the magnetization direction M and the polarization direction P are parallel to both a main surface of the polarizing plate C11 and a main surface of the magnetization fixed layer C16.

When a potential difference is provided between the first electrode C13 and the second electrode C17, a tunnel effect occurs and injects a spin flow (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetized direction M of the magnetization fixed layer C16, that is, magnetization parallel to the polarized direction P of the signal light entering the magnetization free layer C14 through the polarizing plate C11. Thus, a phase of the signal light is delayed by a transverse Kerr effect during a process of transmission in the magnetization free layer C14.

Here, a phase modulation amount of the cell C for the signal light is determined depending on a magnitude of the magnetization in the magnetization free layer C14. The magnitude of the magnetization in the magnetization free layer C14 is determined depending on a magnitude of the spin flow injected into the magnetization free layer C14. The magnitude of the spin flow injected into the magnetization free layer C14 is determined depending on the potential difference provided between the first electrode C13 and the second electrode C17. Thus, by regulating the potential difference provided between the first electrode C13 and the second electrode C17, it is possible to set phase modulation of the cell C at a desired value.

As discussed above, the optical modulation element 12A is constituted by the plurality of cells C that carry out phase modulation by spin injection into the magnetization free layer C14. Therefore, the optical modulation element 12A can switch the optical path of the signal light L from one to another more quickly, when compared to DMD or LCOS.

The description of the present configuration example has dealt with the cell C having a similar configuration to that of a spin transfer torque (STT) magnetoresistive random access memory (MRAM). However, this is not limitative. For example, a cell C having a similar configuration to that of a spin orbit torque (SOT) MRAM may be used. Note that such a cell C can be realized by removing, from the structure indicated in (b) of FIG. 3, the insulating layer C15, the magnetization fixed layer C16, and the second electrode C17, for example. In this case, for example, it is possible to efficiently inject a spin flow into the magnetization free layer C14 by incorporating heavy metal in the first electrode C13 and giving a pulse voltage or a pulse current to the first electrode C13.

Figure 4:
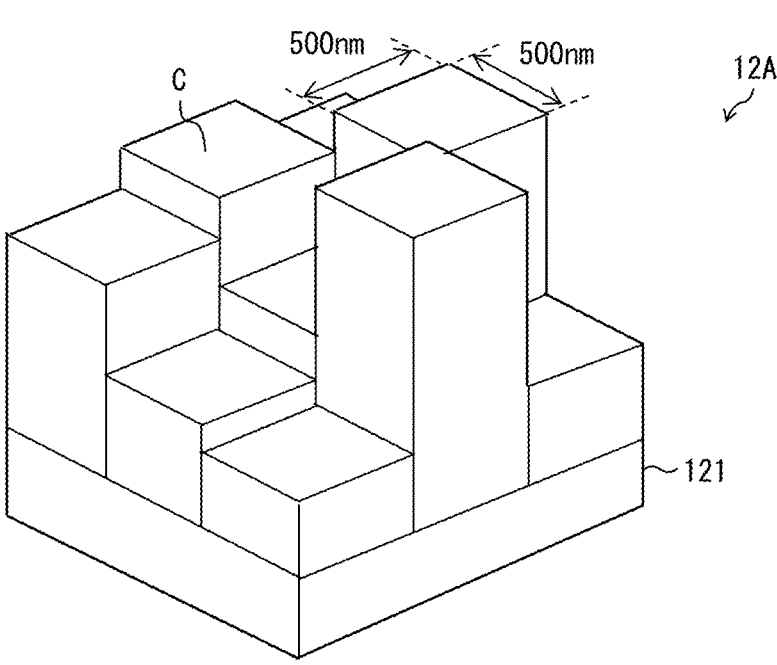
FIG. 4 is an enlarged perspective view of a portion of the optical modulation element included in the optical switch shown in (a) of FIG. 2.

Note that the reflective optical modulation element 12A can be constituted by a plurality of microcells C having phase modulation amounts set independently of each other, that is, a plurality of microcells C having thicknesses or refractive indices set independently of each other. FIG. 4 is an enlarged perspective view of a portion of the optical modulation element 12A constituted by a plurality of microcells C having thicknesses set independently of each other.

The optical modulation element 12A shown in FIG. 4 is constituted by a reflecting plate 121 and a plurality of pillars provided on an upper surface of the reflecting plate 121. Each of the pillars is a quadrangular prism-shaped structure having a square bottom surface with four sides that are all equal to the cell size, and serves as a microcell C.

Signal light L (1) enters an upper surface of the pillar, (2) passes through the pillar, (3) is reflected by the reflecting plate 121, (4) passes through the pillar, and (5) is emitted from the upper surface of the pillar. A phase modulation amount of the signal light L reflected by each microcell C is determined depending on a height of the pillar constituting the microcell C. That is, when reflected by a microcell C constituted by a high pillar, the signal light L has a large phase modulation amount. When reflected by a microcell C constituted by a low pillar, the signal light has a small phase modulation amount. Note that each of the microcells C has a fixed phase modulation amount.

The optical modulation element 12A shown in FIG. 4 can also switch the optical path of the signal light L from one to another more quickly, when compared to DMD or LCOS.

(Configuration Example of Transmissive Optical Modulation Element)

Figure 5:
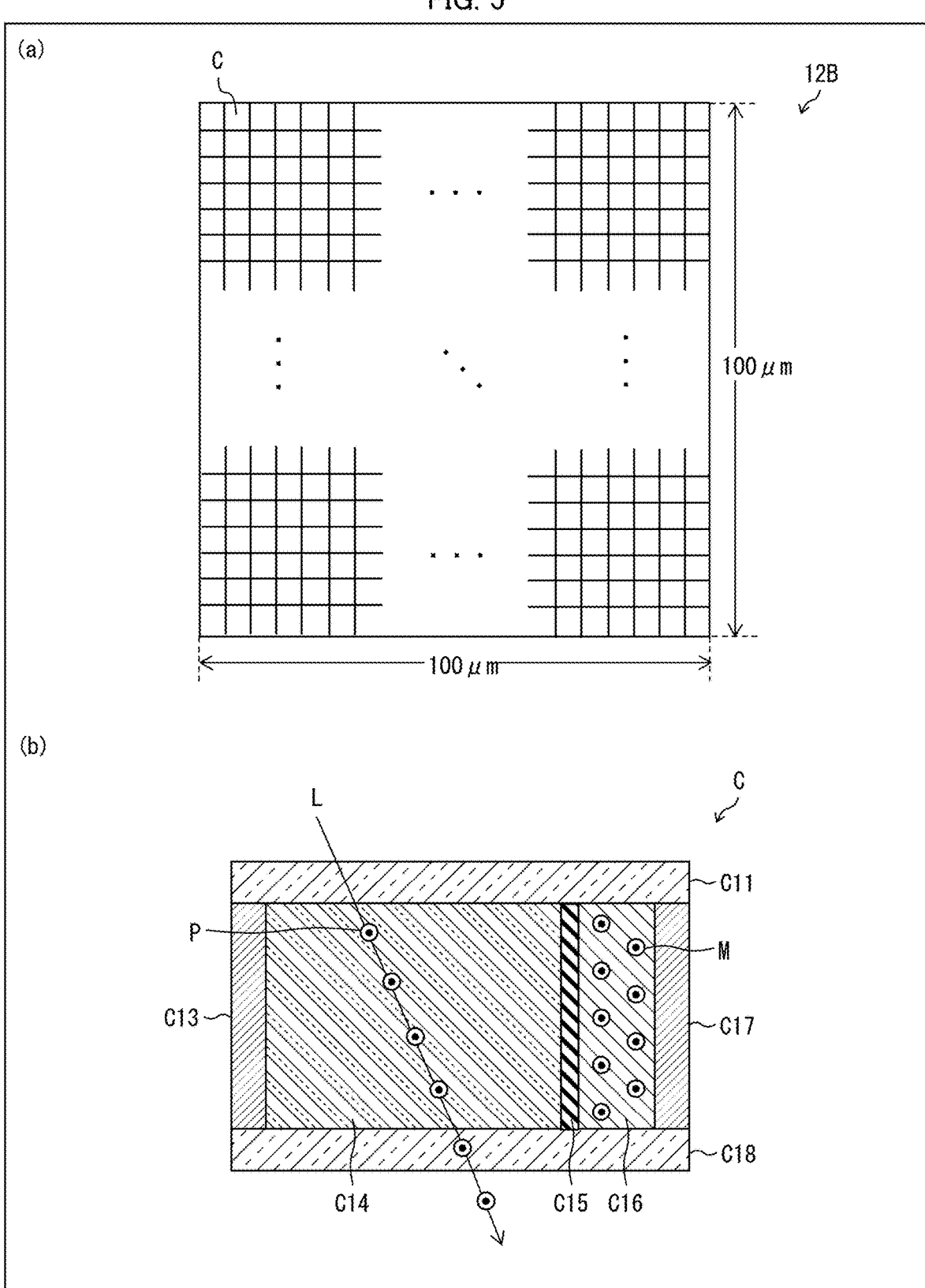
FIG. 5 shows a plan view of the optical modulation element included in the optical switch shown in (b) of FIG. 2 and a cross-sectional view of a cell included in the optical modulation element.

The following description will discuss, with reference to FIG. 5, a configuration example of a transmissive optical modulation element 12B included in the optical switch 1B. (a) of FIG. 5 is a plan view of the optical modulation element 12B in accordance with the present specific example. (b) of FIG. 5 is a cross-sectional view of a microcell C constituting the optical modulation element 12B in accordance with the present specific example.

As shown in (a) of FIG. 5, the optical modulation element 12B is constituted by a plurality of microcells C having phase modulation amounts settable independently of each other. When signal light L enters the optical modulation element 12B, the resulting beams of the signal light L having passed through the microcells C while being subjected to phase modulation interfere with each other, whereby signal light L to be emitted in a direction corresponding to the ratio T/T0 is formed. The phase modulation amount of each microcell C may be variable or fixed. In the present configuration example, the phase modulation amount of each microcell C is variable.

The optical modulation element 12B illustrated as an example in (a) of FIG. 5 is constituted by 200×200 microcells C arranged in a matrix. Each of the microcells C has a square shape having a size of 500 nm×500 nm in a plan view. The optical modulation element 12B has a square shape having a size of 100 μm×100 μm in a plan view.

Each of the microcells C constituting the optical modulation element 12B may include, for example, a polarizing plate C11, a polarizing plate C18, a first electrode C13, a magnetization free layer C14, an insulating layer C15, a magnetization fixed layer C16, and a second electrode C17, as shown in (b) of FIG. 5.

The polarizing plate C11 and the polarizing plate C18 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the polarizing plate C18. Here, a direction in which the first electrode C13, the magnetization free layer C14, the insulating layer C15, the magnetization fixed layer C16, and the second electrode C17 are stacked is orthogonal to a direction in which the polarizing plate C11 and the polarizing plate C18 are stacked. Thus, a first side surface of the magnetization free layer C14 is in surface contact with one main surface of the polarizing plate C11, and a second side surface of the magnetization free layer C14 which second side surface is opposite to the first side surface is in surface contact with one main surface of the polarizing plate C18. Signal light L (1) enters an inside of the magnetization free layer C14 through the polarizing plate C11, (2) passes through the magnetization free layer C14, and (3) is emitted through the polarizing plate C18 to an outside of the magnetization free layer C14.

The magnetization free layer C14 is made of, for example, a soft magnetic material having electric conductivity and light transmissivity (for example, CoFeB). The magnetization fixed layer C16 is made of, for example, a hard magnetic material having electric conductivity (for example, permalloy). Selected as each of the polarizing plates C11 and C18 is a polarizing plate that selectively transmits a polarized light component having a polarization direction P parallel to a magnetization direction M of the magnetization fixed layer C16. (b) of FIG. 5 illustrates, as an example, a case where the magnetization direction M and the polarization direction P are parallel to both a main surface of the polarizing plate C11 and a main surface of the magnetization fixed layer C16.

When a potential difference is provided between the first electrode C13 and the second electrode C17, a tunnel effect occurs and injects a spin flow (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetized direction M of the magnetization fixed layer C16, that is, magnetization parallel to the polarized direction P of the signal light entering the magnetization free layer C14 through the polarizing plate 11. Thus, a phase of the signal light is delayed by a transverse Kerr effect during a process of transmission in the magnetization free layer C14.

Here, a phase modulation amount of the cell C for the signal light is determined depending on a magnitude of the magnetization in the magnetization free layer C14. The magnitude of the magnetization in the magnetization free layer C14 is determined depending on a magnitude of the spin flow injected into the magnetization free layer C14. The magnitude of the spin flow injected into the magnetization free layer C14 is determined depending on the potential difference provided between the first electrode C13 and the second electrode C17. Thus, by regulating the potential difference provided between the first electrode C13 and the second electrode C17, it is possible set phase modulation of the cell C at a desired value.

As discussed above, the optical modulation element 12B is constituted by the plurality of microcells C that carry out phase modulation by spin injection into the magnetization free layer C14. Therefore, the optical modulation element 12B can switch the optical path of the signal light L from one to another more quickly, when compared to DMD or LCOS.

The description of the present configuration example has dealt with the cell C having a similar configuration to that of a spin transfer torque (STT) magnetoresistive random access memory (MRAM). However, this is not limitative. For example, a cell C having a similar configuration to that of a spin orbit torque (SOT) MRAM may be used. Note that such a cell C can be realized by removing, from the structure indicated in (b) of FIG. 5, the insulating layer C15, the magnetization fixed layer C16, and the second electrode C17, for example. In this case, for example, it is possible to efficiently inject a spin flow into the magnetization free layer C14 by incorporating heavy metal in the first electrode C13 and giving a pulse voltage or a pulse current to the first electrode C13.

Figure 6:
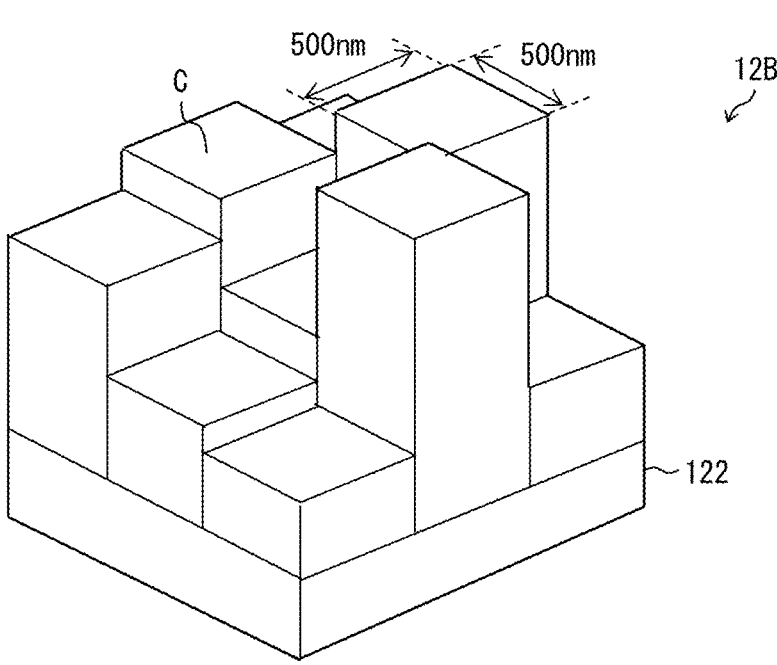
FIG. 6 is an enlarged perspective view of a portion of the optical modulation element included in the optical switch shown in (b) of FIG. 2.

Note that the reflective optical modulation element 12B can be constituted by a plurality of microcells C having phase modulation amounts set independently of each other, that is, a plurality of microcells C having thicknesses or refractive indices set independently of each other. FIG. 6 is an enlarged perspective view of a portion of the optical modulation element 12B constituted by a plurality of microcells C having thicknesses set independently of each other.

The optical modulation element 12B shown in FIG. 6 is constituted by a transparent substrate 122 and a plurality of pillars provided on an upper surface of the transparent substrate 122. Each of the pillars is a quadrangular prism-shaped structure having a square bottom surface with four sides that are all equal to the cell size, and serves as a microcell C. Signal light L (1) enters an upper surface of the pillar, (2) passes through the pillar, (3) passes through the transparent substrate 122, and (4) is emitted from the lower surface of the transparent substrate 122. A phase modulation amount of the signal light L passing through each microcell C is determined depending on a height of the pillar constituting the microcell C. That is, when passing through a microcell C constituted by a high pillar, the signal light L has a large phase modulation amount. When passing through a microcell C constituted by a low pillar, the signal light L has a small phase modulation amount. Note that each of the microcells C has a fixed phase modulation amount.

The optical modulation element 12B shown in FIG. 6 can also switch the optical path of the signal light L from one to another more quickly, when compared to DMD or LCOS.

(Variations of Optical Switch)

Figure 7:
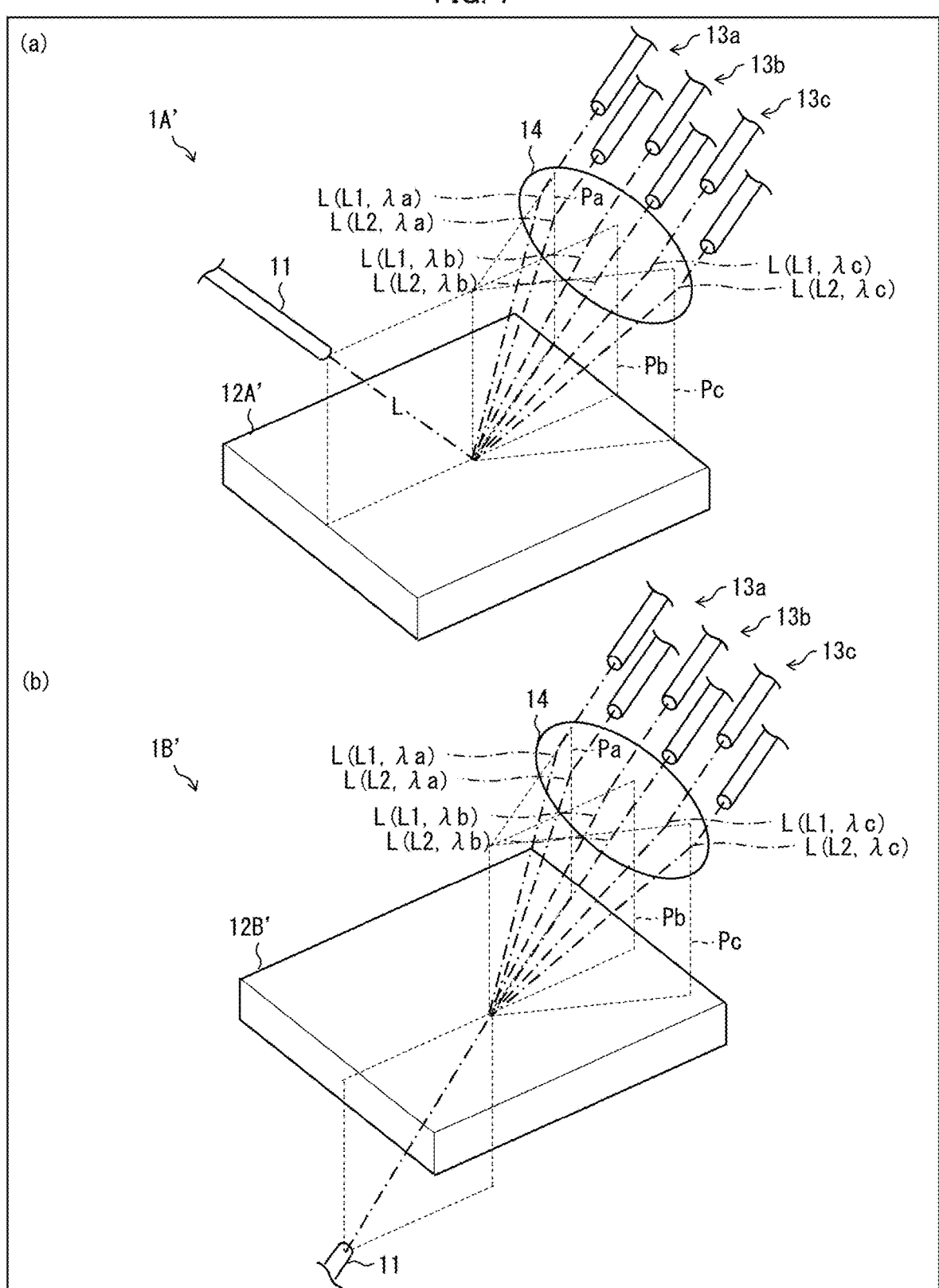
FIG. 7 shows a perspective view of a variation of the optical switch shown in FIG. 2, more specifically, a configuration of an optical switch including a reflective optical modulation element and a configuration of an optical switch including a transmissive optical modulation element.

The following description will discuss, with reference to (a) of FIG. 7, a variation of the optical switch 1A (hereinafter, referred to as an optical switch 1A'). (a) of FIG. 7 is a perspective view illustrating a configuration of the optical switch 1A'.

The optical switch 1A' has the same configuration as that of the optical switch 1A, except that the optical switch 1A' includes an optical modulation element 12A' in place of the optical modulation element 12A and output port groups 13a to 13c in place of the output port group 13.

The optical modulation element 12A' is a means that modulates and reflects signal light L, and is constituted by a plurality of cells having phase modulation amounts settable independently of each other. The phase modulation amounts of the cells constituting the optical modulation element 12A' are set so that the signal light L is emitted in a direction corresponding to a wavelength $\lambda$ of carrier light L0 and a ratio T/T0, which is a ratio of a period T of a control signal C with respect to a period T0 of the carrier light L0. In the illustrated example, the following setting is made.

In a case where the wavelength $\lambda$ of the carrier light L0 is $\lambda$a, the optical modulation element 12A' reflects the signal light L in an in-plane direction of a plane Pa. Particularly, in a case where the signal light L is the above-described signal light L1, that is, in a case where the ratio T/T0 is R1 (2 in the example shown in FIG. 1), the optical modulation element 12A' reflects the signal light L so that an emission angle thereof is $\theta$1 in the plane Pa. Meanwhile, in a case where the signal light L is the above-described signal light L2, that is, in a case where the ratio T/T0 is R2 (3 in the example shown in FIG. 1), the optical modulation element 12A' reflects the signal light L so that an emission angle thereof is $\theta$2 in the plane Pa.

In a case where the wavelength $\lambda$ of the carrier light L0 is $\lambda$b, the optical modulation element 12A' reflects the signal light L in an in-plane direction of a plane Pb. Particularly, in a case where the signal light L is the above-described signal light L1, that is, in a case where the ratio T/T0 is R1 (2 in the example shown in FIG. 1), the optical modulation element 12A' reflects the signal light L so that an emission angle thereof is $\theta$1 in the plane Pb. Meanwhile, in a case where the signal light L is the above-described signal light L2, that is, in a case where the ratio T/T0 is R2 (3 in the example shown in FIG. 1), the optical modulation element 12A' reflects the signal light L so that an emission angle thereof is $\theta$2 in the plane Pb.

In a case where the wavelength $\lambda$ of the carrier light L0 is $\lambda$c, the optical modulation element 12A' reflects the signal light L in an in-plane direction of a plane Pc. Particularly, in a case where the signal light L is the above-described signal light L1, that is, in a case where the ratio T/T0 is R1 (2 in the example shown in FIG. 1), the optical modulation element 12A' reflects the signal light L so that an emission angle thereof is $\theta$1 in the plane Pc. Meanwhile, in a case where the signal light L is the above-described signal light L2, that is, in a case where the ratio T/T0 is R2 (3 in the example shown in FIG. 1), the optical modulation element 12A' reflects the signal light L so that an emission angle thereof is $\theta$2 in the plane Pc.

The output port group 13a is disposed on an optical path of the signal light L which has been reflected by the optical modulation element 12A' and whose wavelength $\lambda$ is $\lambda$a. The output port group 13a is constituted by an output port disposed on an optical path of the signal light L obtained when the ratio T/T0 is R1 and an output port disposed on an optical path of the signal light L obtained when the ratio T/T0 is R2.

The output port group 13b is disposed on an optical path of the signal light L which has been reflected by the optical modulation element 12A' and whose wavelength $\lambda$ is $\lambda$b. The output port group 13b is constituted by an output port disposed on an optical path of the signal light L obtained when the ratio T/T0 is R1 and an output port disposed on an optical path of the signal light L obtained when the ratio T/T0 is R2.

The output port group 13c is disposed on an optical path of the signal light L which has been reflected by the optical modulation element 12A' and whose wavelength λ is λc. The output port group 13c is constituted by an output port disposed on an optical path of the signal light L obtained when the ratio T/T0 is R1 and an output port disposed on an optical path of the signal light L obtained when the ratio T/T0 is R2.

The optical switch 1A' can switch the optical path of the signal light L from one to another not only according to the period T of the control signal C but also according to the wavelength λ of the signal light L. Further, in a case where the signal light L is a wavelength-division multiplexed one, the optical switch 1A' can separate wavelength components in the signal light L from each other.

The following description will discuss, with reference to (b) of FIG. 7, a variation of the optical switch 1B (hereinafter, referred to as an optical switch 1B'). (b) of FIG. 7 shows a perspective view illustrating a configuration of the optical switch 1B'.

The optical switch 1B' has the same configuration as that of the optical switch 1B, except that the optical switch 1B' includes an optical modulation element 12B' in place of the optical modulation element 12B and output port groups 13a to 13c in place of the output port group 13.

The optical modulation element 12B' is a means that modulates and refracts signal light L, and is constituted by a plurality of cells having phase modulation amounts settable independently of each other. The phase modulation amounts of the cells constituting the optical modulation element 12B' are set so that the signal light L is emitted in a direction corresponding to a wavelength λ of carrier light L0 and a ratio T/T0, which is a ratio of a period T of a control signal C with respect to a period T0 of carrier light L0. In the illustrated example, the following setting is made.

In a case where the wavelength λ of the carrier light L0 is λa, the optical modulation element 12B' refracts the signal light L in an in-plane direction of a plane Pa. Particularly, in a case where the signal light L is the above-described signal light L1, that is, in a case where the ratio T/T0 is R1 (2 in the example shown in FIG. 1), the optical modulation element 12B' refracts the signal light L so that an emission angle thereof is θ1 in the plane PB. Meanwhile, in a case where the signal light L is the above-described signal light L2, that is, in a case where the ratio T/T0 is R2 (3 in the example shown in FIG. 1), the optical modulation element 12B' refracts the signal light L so that an emission angle thereof is θ2 in the plane Pa.

In a case where the wavelength λ of the carrier light L0 is λb, the optical modulation element 12B' refracts the signal light L in an in-plane direction of a plane Pb. Particularly, in a case where the signal light L is the above-described signal light L1, that is, in a case where the ratio T/T0 is R1 (2 in the example shown in FIG. 1), the optical modulation element 12B' refracts the signal light L so that an emission angle thereof is θ1 in the plane Pb. Meanwhile, in a case where the signal light L is the above-described signal light L2, that is, in a case where the ratio T/T0 is R2 (3 in the example shown in FIG. 1), the optical modulation element 12B' refracts the signal light L so that an emission angle thereof is θ2 in the plane Pb.

In a case where the wavelength λ of the carrier light L0 is λc, the optical modulation element 12B' refracts the signal light L in an in-plane direction of a plane Pc. Particularly, in a case where the signal light L is the above-described signal light L1, that is, in a case where the ratio T/T0 is R1 (2 in the example shown in FIG. 1), the optical modulation element 12B' refracts the signal light L so that an emission angle thereof is θ1 in the plane Pc. Meanwhile, in a case where the signal light L is the above-described signal light L2, that is, in a case where the ratio T/T0 is R2 (3 in the example shown in FIG. 1), the optical modulation element 12B' refracts the signal light L so that an emission angle thereof is θ2 in the plane Pc.

The output port group 13a is disposed on an optical path of the signal light L which has been reflected by the optical modulation element 12B' and whose wavelength λ is λa. The output port group 13a is constituted by an output port disposed on an optical path of the signal light L obtained when the ratio T/T0 is R1 and an output port disposed on an optical path of the signal light L obtained when the ratio T/T0 is R2.

The output port group 13b is disposed on an optical path of the signal light L which has been reflected by the optical modulation element 12B' and whose wavelength λ is λb. The output port group 13b is constituted by an output port disposed on an optical path of the signal light L obtained when the ratio T/T0 is R1 and an output port disposed on an optical path of the signal light L obtained when the ratio T/T0 is R2.

The output port group 13c is disposed on an optical path of the signal light L which has been reflected by the optical modulation element 12B' and whose wavelength λ is λc. The output port group 13c is constituted by an output port disposed on an optical path of the signal light L obtained when the ratio T/T0 is R1 and an output port disposed on an optical path of the signal light L obtained when the ratio T/T0 is R2.

The optical switch 1B' can switch the optical path of the signal light L from one to another not only according to the period T of the control signal C but also according to the wavelength λ of the carrier light L0. In a case where the signal light L is a wavelength-division multiplexed one, the optical switch 1B' can separate wavelength components in the signal light L from each other.

Aspects of one or more embodiments can also be expressed as follows:

An optical switch in accordance with a first aspect of one or more embodiments is an optical switch that switches an optical path of signal light from one to another, the signal light being obtained by modulating carrier light by a control signal and a data signal, the optical switch including: an optical modulation element configured to reflect or refract the signal light, the optical modulation element including a plurality of cells having phase modulation amounts settable independently of each other, the phase modulation amounts of the plurality of cells included in the optical modulation element being set so that the signal light is emitted in a direction corresponding to a ratio of a period of the control signal with respect to a period of the carrier light.

In accordance with the above configuration, it is possible to switch the optical path of the signal light from one to another according to the period of the control signal.

An optical switch in accordance with a second aspect of one or more embodiments is configured such that, in addition to the configuration of the first aspect, the phase modulation amounts of the plurality of cells included in the optical modulation element are set so that the signal light is emitted in a direction corresponding to a wavelength of the carrier light and the ratio.

In accordance with the above configuration, it is possible to switch the optical path of the signal light from one to another not only according to the period of the control signal but also according to the wavelength of the signal light.

An optical switch in accordance with a third aspect of one or more embodiments is configured such that, in addition to the configuration of the first or second aspect, the optical switch further includes: an input port which guides the signal light having not been reflected or refracted by the optical modulation element yet; and a plurality of output ports each of which guides the signal light having been reflected or refracted by the optical modulation element.

In accordance with the above configuration, it is possible to switch, from one to another, the output port that guide the signal light, according to the period of the control signal.

An optical switch in accordance with a fourth aspect of one or more embodiments is configured such that, in addition to the configuration of any one of the first to third aspects, the optical modulation element is a reflective optical modulation element; and the phase modulation amounts of the plurality of cells included in the optical modulation element are set so that the signal light is reflected in the direction corresponding to the ratio of the period of the control signal with respect to the period of the carrier light.

In accordance with the above configuration, it is possible to realize a reflective optical switch that can switch the optical path of the signal light from one to another according to the period of the control signal.

An optical switch in accordance with a fifth aspect of one or more embodiments is configured such that, in addition to the configuration of any one of the first to third aspects, the optical modulation element is a transmissive optical modulation element; and the phase modulation amounts of the plurality of cells included in the optical modulation element are set so that the signal light is refracted in the direction corresponding to the ratio of the period of the control signal with respect to the period of the carrier light.

In accordance with the above configuration, it is possible to realize a transmissive optical switch that can switch the optical path of the signal light from one to another according to the period of the control signal.

An optical switch in accordance with a sixth aspect of one or more embodiments is configured such that, in addition to the configuration of any one of the first to fifth aspects, each of the plurality of cells carries out phase modulation by spin injection into a magnetization free layer.

In accordance with the above configuration, it is possible to quickly switch the optical path of the signal light from one to another according to the period of the control signal.

A switching method in accordance with a seventh aspect of one or more embodiments is a switching method that switches an optical path of signal light from one to another, the signal light being obtained by modulating carrier light by a control signal and a data signal, the switching method including the step of: reflecting or refracting the signal light with use of an optical modulation element including a plurality of cells having phase modulation amounts settable independently of each other, the phase modulation amounts of the plurality of cells included in the optical modulation element being set so that the signal light is emitted in a direction corresponding to a ratio of a period of the control signal with respect to a period of the carrier light.

In accordance with the above configuration, it is possible to switch the optical path of the signal light from one to another according to the period of the control signal.

(Supplementary Notes)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B, 1A', 1B': optical switch
11: input port
12A, 12A', 12B, 12B': optical modulation element
13, 13$a$, 13$b$, 13$c$: output port group

The invention claimed is:

1. An optical switch that switches an optical path of signal light obtained by modulating carrier light by a control signal and a data signal, comprising:
   an optical modulation element that:
      reflects or refracts the signal light, and
      includes cells each having an independently set phase modulation amount with which the signal light is emitted in a direction corresponding to a ratio of a period of the control signal to a period of the carrier light.

2. The optical switch according to claim 1, wherein that the signal light is emitted in a direction corresponding to a wavelength of the carrier light and the ratio.

3. The optical switch according to claim 1, further comprising:
   an input port that guides the signal light that has not yet been reflected or refracted by the optical modulation element; and
   output ports each of which guides the signal light reflected or refracted by the optical modulation element.

4. The optical switch according claim 1, wherein
   the optical modulation element is a reflective optical modulation element, and
   the signal light is reflected in the direction corresponding to the ratio.

5. The optical switch according to claim 1, wherein
   the optical modulation element is a transmissive optical modulation element, and
   the signal light is refracted in the direction corresponding to the ratio.

6. The optical switch according to claim 1, wherein each of the cells carries out phase modulation by spin injection into a magnetization free layer.

7. A switching method comprising:
   switching an optical path of signal light obtained by modulating carrier light by a control signal and a data signal;
   reflecting or refracting the signal light with an optical modulation element including cells each having an independently set phase modulation amount with which the signal light is emitted in a direction corresponding to a ratio of a period of the control signal to a period of the carrier light.

* * * * *